M. F. WATKINS.
DRIVING MECHANISM FOR SICKLE BARS.
APPLICATION FILED MAR. 12, 1909.
937,123.
Patented Oct. 19, 1909.
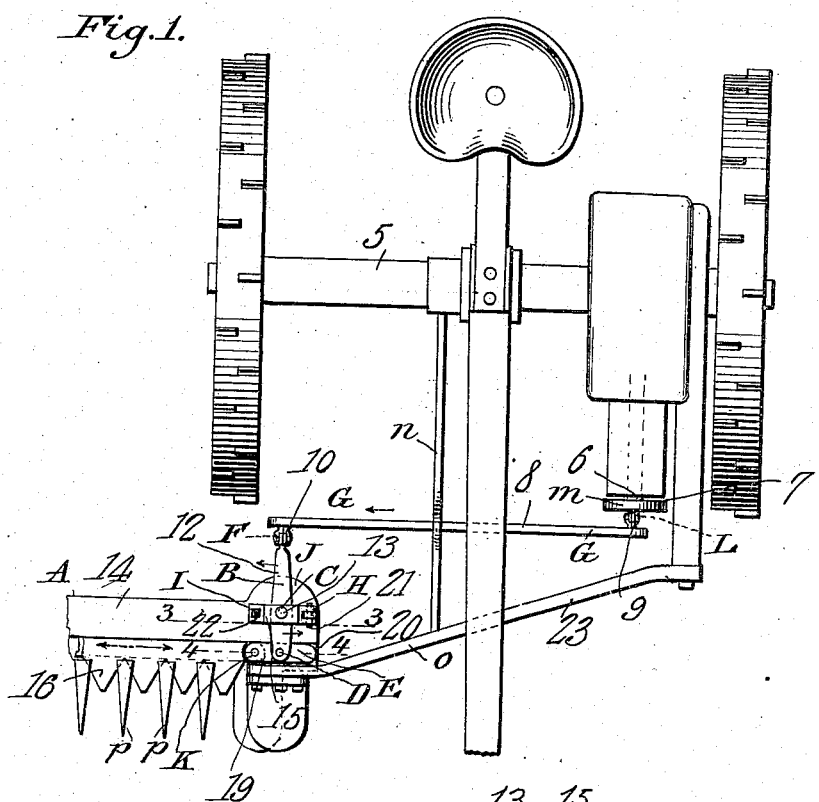
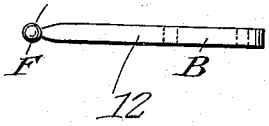
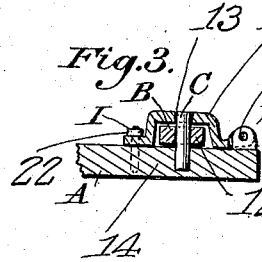
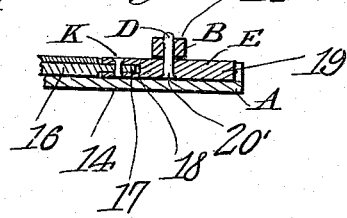
Witnesses:
G. U. Griffin
F. G. Griffin
Inventor:
Maura Forest Watkins

UNITED STATES PATENT OFFICE.

MAURA FOREST WATKINS, OF STAR LIME WORKS, KENTUCKY.

DRIVING MECHANISM FOR SICKLE-BARS.

937,123.  Specification of Letters Patent.  Patented Oct. 19, 1909.

Application filed March 12, 1909.  Serial No. 483,077.

*To all whom it may concern:*

Be it known that I, MAURA F. WATKINS, a citizen of the United States, residing at Star Lime Works, in the county of Lyon and State of Kentucky, have invented a new and useful Driving Mechanism for Sickle-Bars, of which the following is a specification.

This invention relates to driving mechanism for sickle bars of mowing machines and the like and one of its objects is to provide simple mechanism of this character whereby friction is reduced to the minimum.

Another object is to provide driving mechanism which is easy to operate, is formed of few parts and can be readily repaired.

With these and other objects in view the invention consists of certain novel details of construction and combination of parts hereinafter more fully described and pointed out in the claims.

In the accompanying drawings the preferred form of the invention has been shown.

In said drawings: Figure 1 is a plan view of a mowing machine having the present improvements applied thereto. Fig. 2 is a detail view of actuating lever. Fig. 3 is an enlarged section on line 3—3, Fig. 1. Fig. 4 is a section on line 4—4, Fig. 1.

Referring to the figures by characters of reference, 5 designates a mowing machine having the driving shaft 6 thereon designed to be operated in any preferred manner, there being a disk 7 upon this shaft for driving a pitman 8. The disk and pitman are connected by a universal joint 9, one member of which constitutes a wrist pin. A socket 10 is arranged upon the pitman at that end thereof farthest removed from the joint 9, and engages a ball 11, formed at one end of lever 12. This lever is mounted upon a pivot 13, supported upon a cutter bar 14, and engaging a bracket 15, which is secured on the cutter bar. The sickle 16, is mounted to reciprocate in the usual manner upon the bar 14 and is provided at one end with a tongue 17. This tongue projects into the forked end 18, of slide 19, there being a longitudinal groove or channel 20 within the cutter bar and in which this slide is guided. The lever 12 is pivotally connected to the slide as indicated at 20'.

As shown in Fig. 3 the bracket 15 heretofore referred to is hingedly connected at one end to the cutter bar as shown at 21, the other end of the bracket being secured to the cutter bar by means of a bolt 22 or in any other preferred manner. It is of course to be understood that the cutter bar is attached to the main portion of the machine by means of one or more bars 23. When the shaft 6 and the disk 7 are rotated, motion will be transmitted to the lever 12, through pitman 8 and the oscillation of this lever will result in the reciprocation of slide 19 on the cutter bar 20 and the sickle connected to it. The lever can readily be placed in position by removing the bolt 22 from the bracket 15 and swinging it upwardly upon its hinges 21. It will be noted that the pivot pin or stud 13, is secured to the cutter member 14 and extends loosely into the lever 12 and the bracket 15, while the pivot stud or pin 20 is secured to the slide 19 and projects loosely into the lever 12. It will be obvious therefore, that these pivot devices cannot become loose and the bracket 15 when secured in the position indicated in Fig. 3 serves to secure the lever in engagement with said pivot devices.

By arranging the parts in the manner shown and described, friction is reduced to the minimum and rattling of the mechanism is practically eliminated.

It is of course to be understood that various changes may be made in the construction and arrangement of the parts without departing from the spirit or sacrificing any of the advantages of the invention.

What is claimed is:—

1. A machine of the class described including a cutter bar, a bracket hingedly mounted thereon, a pivot device extending from the bar and into the bracket, a lever removably mounted upon the pivot device, means for securing the bracket upon the bar to hold the lever against displacement, a slide pivotally connected to the lever and mounted on the bar, a sickle connected to and actuated by the slide and means for actuating the lever.

2. A machine of the class described including a revoluble driving element, a cutter bar, a bracket hingedly connected to the bar, a pivot device extending from the bar and into the bracket, a lever fulcrumed on said device and held in engagement therewith by the bracket, means for securing the bracket upon the bar, a slide actuated by the lever, a sickle connected thereto and movable therewith, a pitman, and separate universal connections between the pitman and the lever and driving element respectively.

MAURA FOREST WATKINS.

Witnesses:
G. U. GRIFFIN,
F. G. GRIFFIN.